(12) United States Patent
Harris

(10) Patent No.: US 11,608,010 B1
(45) Date of Patent: Mar. 21, 2023

(54) ROAD DETECTION SYSTEM WITH EXTENDABLE SENSORS

(71) Applicant: Scott C Harris, San Diego, CA (US)

(72) Inventor: Scott C Harris, San Diego, CA (US)

( * ) Notice: Subject to any disclaimer, the term of this patent is extended or adjusted under 35 U.S.C. 154(b) by 0 days.

(21) Appl. No.: 17/805,459

(22) Filed: Jun. 4, 2022

(51) Int. Cl.
| | |
|---|---|
| *B60R 11/04* | (2006.01) |
| *B60R 1/22* | (2022.01) |
| *B64C 39/02* | (2023.01) |
| *B64U 101/30* | (2023.01) |

(52) U.S. Cl.
CPC ............ *B60R 11/04* (2013.01); *B60R 1/22* (2022.01); *B64C 39/024* (2013.01); *B60R 2300/105* (2013.01); *B60R 2300/8086* (2013.01); *B64U 2101/30* (2023.01)

(58) Field of Classification Search
CPC ..... B60R 11/04; B60R 1/22; B60R 2300/105; B60R 2300/8086; B64C 39/024; B64C 2201/127
USPC .......................................................... 348/148
See application file for complete search history.

(56) References Cited

U.S. PATENT DOCUMENTS

| | | | | |
|---|---|---|---|---|
| 4,514,068 | A  * | 4/1985 | Urquhart | F16M 11/08 352/132 |
| 6,690,978 | B1 * | 2/2004 | Kirsch | G01S 5/0072 700/60 |
| 2008/0144156 | A1 * | 6/2008 | Goodman | G02B 23/08 359/226.1 |
| 2016/0243988 | A1 * | 8/2016 | Peterson | B60R 1/0617 |
| 2016/0245011 | A1 * | 8/2016 | Schuetz | H04N 23/51 |
| 2017/0244902 | A1 * | 8/2017 | DiMenichi | B60R 11/04 |
| 2021/0116942 | A1 * | 4/2021 | Gandiga | B60P 3/11 |
| 2021/0302463 | A1 * | 9/2021 | Wilke | G06F 3/017 |
| 2021/0349180 | A1 * | 11/2021 | Han | H04N 5/247 |
| 2022/0308578 | A1 * | 9/2022 | Yamazato | G05D 1/0027 |

* cited by examiner

*Primary Examiner* — Joseph G Ustaris
*Assistant Examiner* — Matthew David Kim

(57) ABSTRACT

A sensor system for a vehicle includes sensors that can be extended further away from the vehicle in order to obtain additional information. The sensors can be kept in their stowed position, to obtain the minimum amount of information but to maintain maximum of the looks of the vehicle. The sensors can then be extended to obtain additional information about the vehicles.

17 Claims, 5 Drawing Sheets

ROAD DETECTION SYSTEM WITH EXTENDABLE SENSORS

BACKGROUND

Modern vehicles use sensors to detect road conditions. This is used for self driving purposes, and to protect against danger to the vehicle occupant. The sensors include, for example, cameras, lidar detectors, radar detectors, sonar detectors, and any other item that can detect conditions on a roadway or other channels for a vehicle.

Certain commercial type vehicles have sensors that extend far beyond the skin of the vehicle, including outside the sides of the vehicles like rear view mirrors, and above the vehicles. These vehicles, like self driving trucks and self driving taxis often have sensors like this. However, the makers of vehicles for use by consumers have typically favored aesthetics over the placement of sensors outside the vehicle skin.

SUMMARY

Aspects of the present invention describe the vehicle, in an embodiment an automobile, with extendable sensors. During many automobile operations, including when parked, and when not needed, the sensors are retracted, and do not affect the aesthetics of the vehicle. However, when necessary or desirable due to road conditions or to investigate or view a path that has been selected along the road, the sensors are extended to a location where they have a better review of the road.

In an embodiment, the sensors can include a sensor on an extendable and telescopic cylindrical rods, herein, "stalk" that is extended.

The sensors can be cameras. In another embodiment, the sensors can be other kind of sensors, including lidar or radar antennas. These are extended when necessary, and retracted when not necessary.

In another embodiment, the sensors are located on a device that is separable from the vehicle. In one embodiment, this device is a drone. The drone can separate from the vehicle in order to determine road conditions, and report those road conditions back to the vehicle.

BRIEF DESCRIPTION OF THE DRAWINGS

These and other aspects will now be described with reference to the accompanying drawings wherein.

The Drawings show aspects of the invention, and specifically.

DETAILED DESCRIPTION

Any of the embodiments described herein may be used together, or separate parts thereof can be used as separate embodiments.

Figure 1:
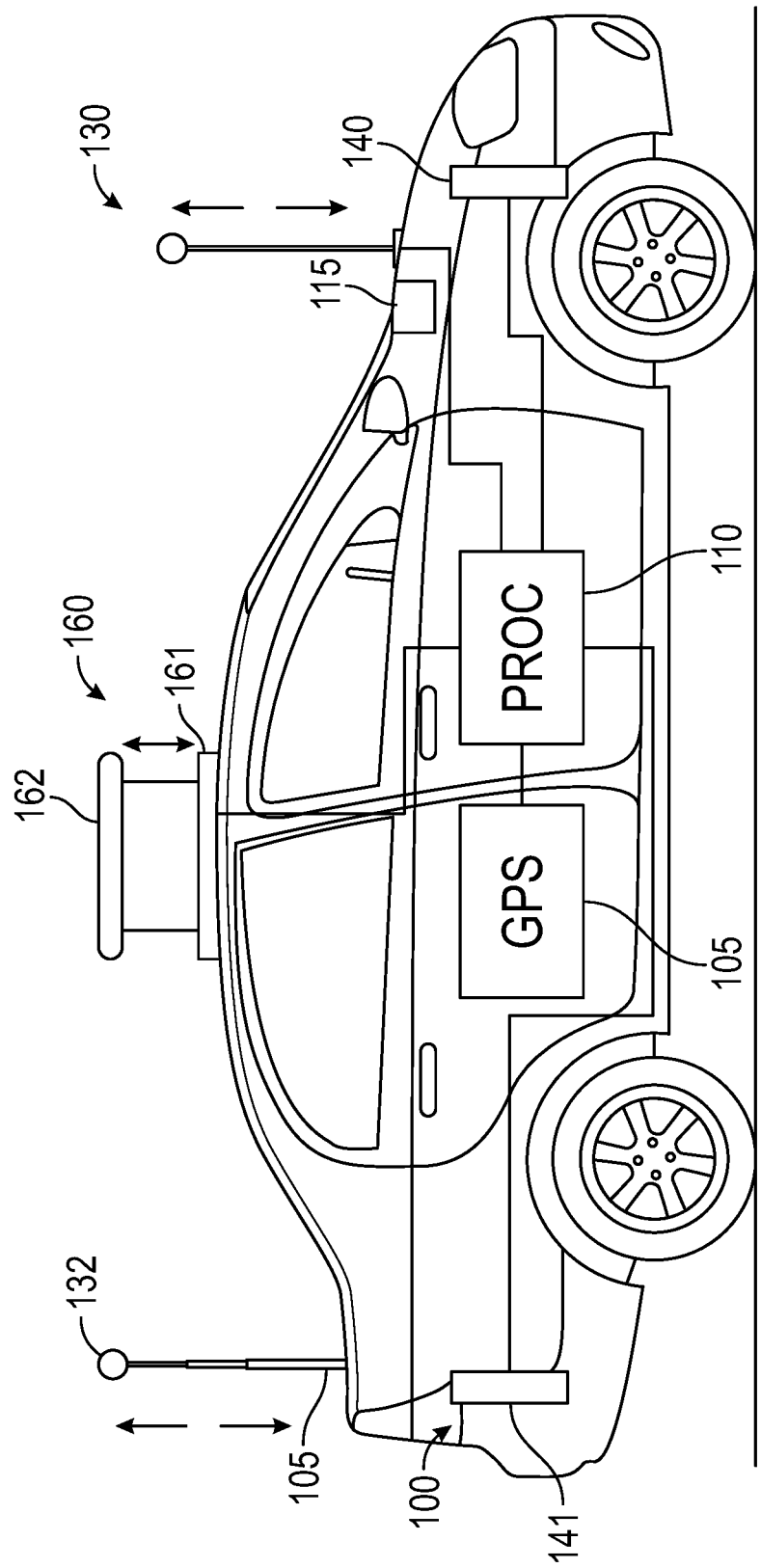
FIG. 1 shows a side view of the vehicle with extendable sensors.

FIG. 1 illustrates a vehicle 100 which is outfitted with a number of extendable sensors. The sensors as used herein can be any of the sensors or sensor receptors described herein, including those described relative to FIGS. 4, 5 and 6.

The vehicle 100 is shown as having a GPS navigator 105 and a processor 110 that controls different actions and activities of the vehicle. The vehicle also includes a user interface shown as 115, which can include a display screen and touchscreen or other command entry screen.

The vehicle includes a number of sensors, such as 120, on extendable stalks 125. The stalks can be any item that can raise and lower the sensors or sensor receptors. In an embodiment, the stalks are telescopic cylindrical metal devices, of the type commonly used for telescopic radio antennas that can be extended up and down using motive force from a motor to drive the stalks up and down. The sensors are at the terminal ends of the stalks that are extended when the stalks are driven up. In one embodiment, the sensor can be right at the end of the stalk.

Figure 2:
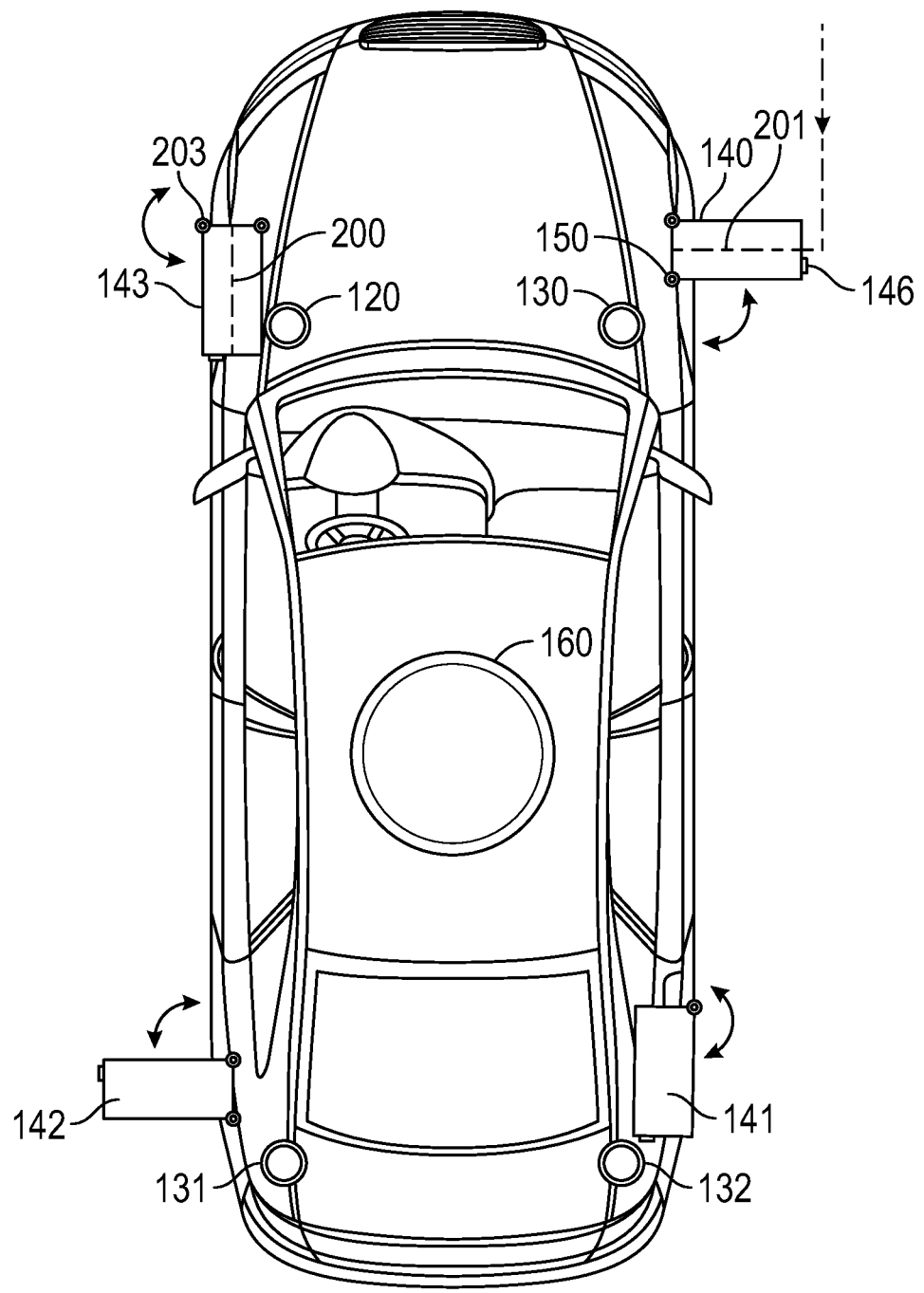
FIG. 2 shows a top view of the vehicle, showing different ways in which the sensors can extend.

FIG. 2 shows the vehicle 100 from the top. This shows how there can be four stalks 120, 130, 131 and 132. These can be located towards edges of the vehicle; however; the stalks can be located in general at any location. The stalks extend upward, using for example a telescoping system with a motor that drives the stalk to the upward position. For example, the stalk may extend from 6 inches to as high as 24 inches above the level of the skin of the vehicle, where the skin is defined by the outer perimeter of the vehicle, or higher as necessary.

The vehicle also has sideward extending sensors, shown as 140, 141, 142 and 143. Each of the side ward extending sensors pivots on a pivot mechanism, e.g., a hinge 150, based on motive force from a motor, to move between a stowed position where the sensor arm is tucked inside the vehicle. to an extended position. In the stowed position, the sensor arm folds into the vehicle as shown by the arm 143, with an axis 200 of the arm that is along the length of the arm parallel to the skin of the vehicle, but the sensor 203 on that arm remains exposed even though the arm is stowed. In the unfolded position, the sensor arm 140 extends to have its axis 201 extend in a direction perpendicular to the outer surface of the skin of the vehicle.

The sensor arm 151 pivots on a pivot mechanism 152 between the stowed position (shown by sensor 143) and the unfolded position shown by sensor 151. In the stowed position, the axis extending along the longitudinal extent of the arm is parallel to the outer skin of the vehicle. In the unfolded position, the axis extending along the axis longitudinal extent of the arm is perpendicular to the outer surface of the skin of the vehicle.

The sensor module itself, such as 146, is at the end of each arm, and thus extends away from the vehicle a maximum distance from the vehicle when the arm is unfolded.

In a similar way, the arms 141, 142 extend between stowed positions in which they tuck into the vehicle body but their sensors are unfolded, and to extended positions as shown in FIG. 2 where they extend away from the vehicle.

Figure 3:
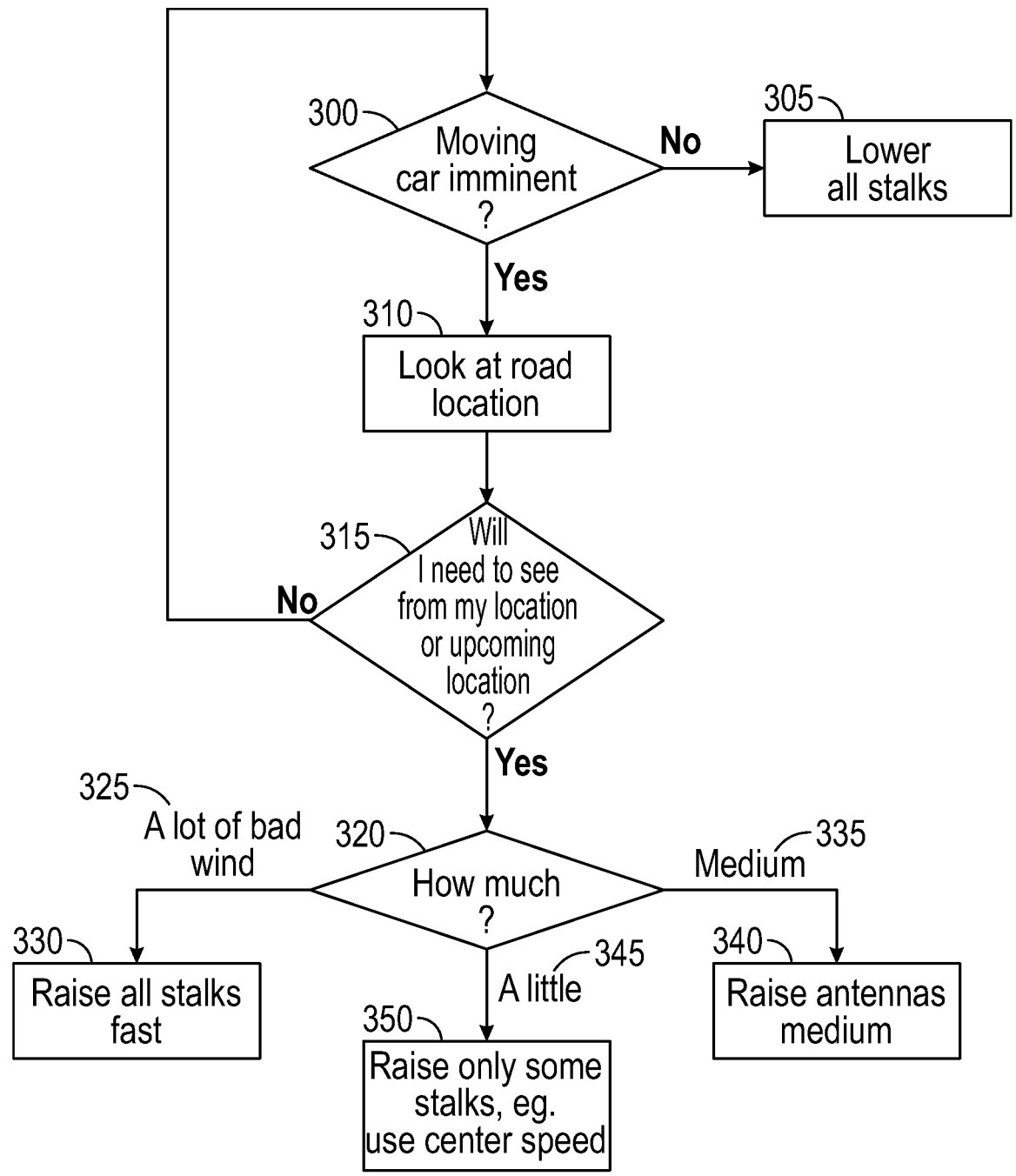
FIG. 3 shows a flowchart of operation of determining how to extend the sensors.

The operation operates according to the flowchart of FIG. 3. The flowchart of FIG. 3 can be executed by the processor 110. At 300, the system determines if the vehicle is moving or will imminently be moving. For example, if the vehicle is stopped and turned off, then no imminent movement occurs, and the stalks can be lowered at 305. 310 looks at the road location, to determine if additional sensor operations are going to be needed. 315 makes this determination: based on the road location, and the amount of information available, and possible store of information about road conditions, topography, terrain or difficulty of navigating the road, all of which contribute to determining if a user will be able to see their location from an upcoming area. If not, then flow returns, until a future time when a user will need to see their location.

If the system determines a need to see additional information about the current path, then 320 determines the amount of aggressiveness of extensions of both stalks, side extensions, and dome extensions. The extensions can be set at levels including aggressive at 325, for example when the system is in a bad viewing location. When this happens at 330, the system can raise all of the extensions very fast. A medium operation is determined at 335, wherein the system determines that it may need additional information, but the additional information will not be imminent. The extensions can be extended by a medium amount, for example halfway or at lower speed. Finally, 345 is a minimal amount, where the extensions are only raised a little or at a slow speed.

If the vehicle is not moving, there can be multiple reasons for this. The vehicle could be in traffic, or could be at a red light. In this condition, the mounts should not be retracted, because the vehicle may immediately start moving again when the light changes or the traffic eases. The fact that the vehicle is not moving or not moving very much may cause the condition to go from maximum raising of stalks in 330 to medium raising of stalks in 340. On the other hand, when the vehicle determines that it is in a parking space for example and not about to move, then the vehicle can lower all of the mounts and stalks.

Figure 4:
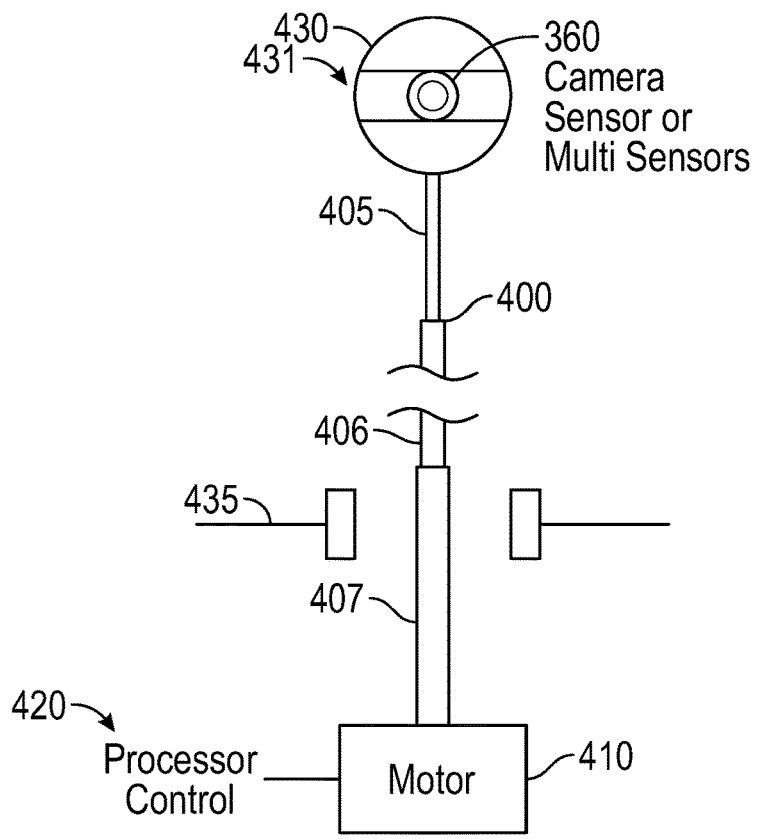
FIG. 4 illustrates an exemplary camera as a sensor on a stalk.
Figure 5:
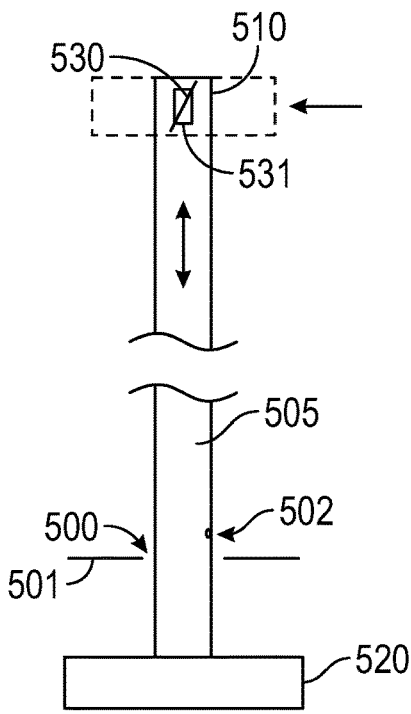
FIG. 5 illustrates an embodiment where the stalk extends a radiation guide to the sensor, where the sensor is maintained inside the vehicle.
Figure 6:
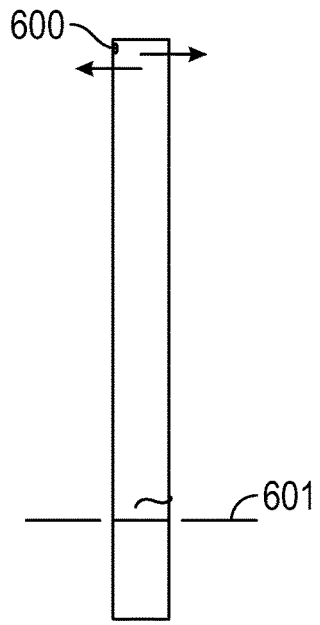
FIG. 6 illustrates an extendable antenna for the sensor.

FIGS. 4, 5 and 6 illustrate different sensors that can be used according to the present application. The term "sensor" as used herein, includes all of these sensors, including sensor chips, antennas, and radiation receivers of any type.

FIG. 4 illustrates a first embodiment, where the stalk 400 is actually a telescopic stalk formed of multiple sections 405, 406, 407. Each section fits telescopically inside another section, enabling the motor 410 to raise the stalk by large amounts under control of the processor shown as 420. The camera 430 is located at the top of the stalk. This camera can be capable of imaging in multiple different directions. In one embodiment, the camera as needed, is moved in pan and tilt directions, or includes multiple different sensors.

When the stalk is lowered, the edges 431 of the sensor body fit tightly into a corresponding gasket 435 in the vehicle, to seal the opening in the vehicle using the sides of the sensor body, when the stalk is lowered.

FIG. 5 illustrates an alternative embodiment, which uses an extendable stalk 500. The stalk 500 has an interior surface which forms a radiation guide 505, which guides radiation from the input location 510, past a controlled movable mirror 530, down to an electronic sensor device 520 that is inside the vehicle skin. The stalk can be maintained at a lowered position shown is 502 in which it is receiving information just from above the skin 501 of the vehicle. When raised, the stalk raises above the skin of the vehicle. The radiation input port 510 can receive radiation, which is reflected down the radiation to the receiver chip 520.

In one embodiment, the radiation guide can be a light guide, the mirror can be a light mirror, and the input part can be a clear part that allows light and images to input, be reflected down the radiation guide, into the chip 520. The mirror 530 can include a motor 531 that moves the mirror to different angles to allow obtaining images from different locations relative to the input port 510.

In another embodiment, shown in FIG. 6, the sensor is a radar or lidar sensor 600, or antenna for the sensor, that can extend from just above the skin 601 of the vehicle to the upward most position where it is shown in FIG. 6.

Sometimes, the user in a vehicle either wants to, or needs to, see what is happening a long distance away from the vehicle. For example, a vehicle that is completely stopped in stopped traffic may have no way of knowing what has stopped the traffic up ahead, how far the traffic has stopped up ahead, or if there are dangerous situations up ahead so the user can appropriately plan.

Figure 7:
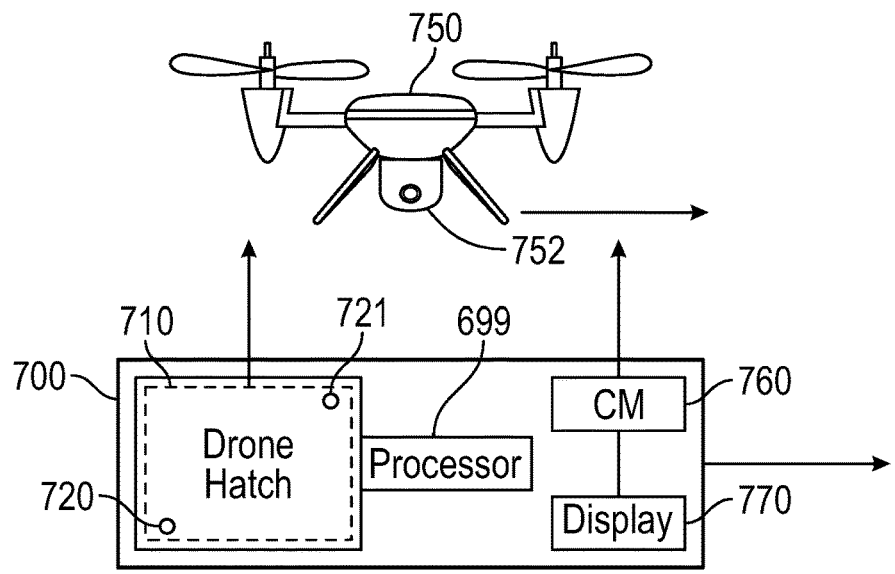
FIG. 7 illustrates an embodiment where a device with sensors is separable from the vehicle, and its sensors are used to communicate with the vehicle, in FIG. 7 the device being a drone.

The embodiment shown in FIG. 7 enables using a separable device, in FIG. 7 a flying drone. In one embodiment, the drone can be completely free flying. The drone can separate from the vehicle, and automatically operate under control of the vehicle systems to attempt to obtain further information about the positioning and operation of the vehicle. In another embodiment, the drone can be attached to the vehicle on a tether line that allows the drone to raise by some distance, e.g., 20 feet, and supplies power and data over the tether line. The embodiment described herein is for a free flying drone, however, the tethered drone embodiment may use similar operations and structure.

In FIG. 7, the vehicle 700 traveling along the path (or in the case of a traffic jam, stopped along the path), has a drone compartment 710. The drone compartment has charging contacts 720, 721 on the drone. For a tethered drone, the charging contacts will not be used. The drone itself 750 normally sits in the vehicle, and is charged by sitting in the vehicle. When sitting in the vehicle, the camera on the drone can be located to still obtain imaging from its location in the drone compartment.

Either automatically, or when the user commands it, the drone 750 is released from the vehicle, climbs into the air, to obtain an image of a long distance away from the vehicle using its sensor e.g. a camera 752. The drone communicates with a communication structure 760 in the vehicle, to provide information to the vehicle and display this on a display in the vehicle.

In one embodiment, the drone can obtain information for navigation of the vehicle. In another embodiment, the drone can obtain information about the future route of the vehicle.

Figure 8:
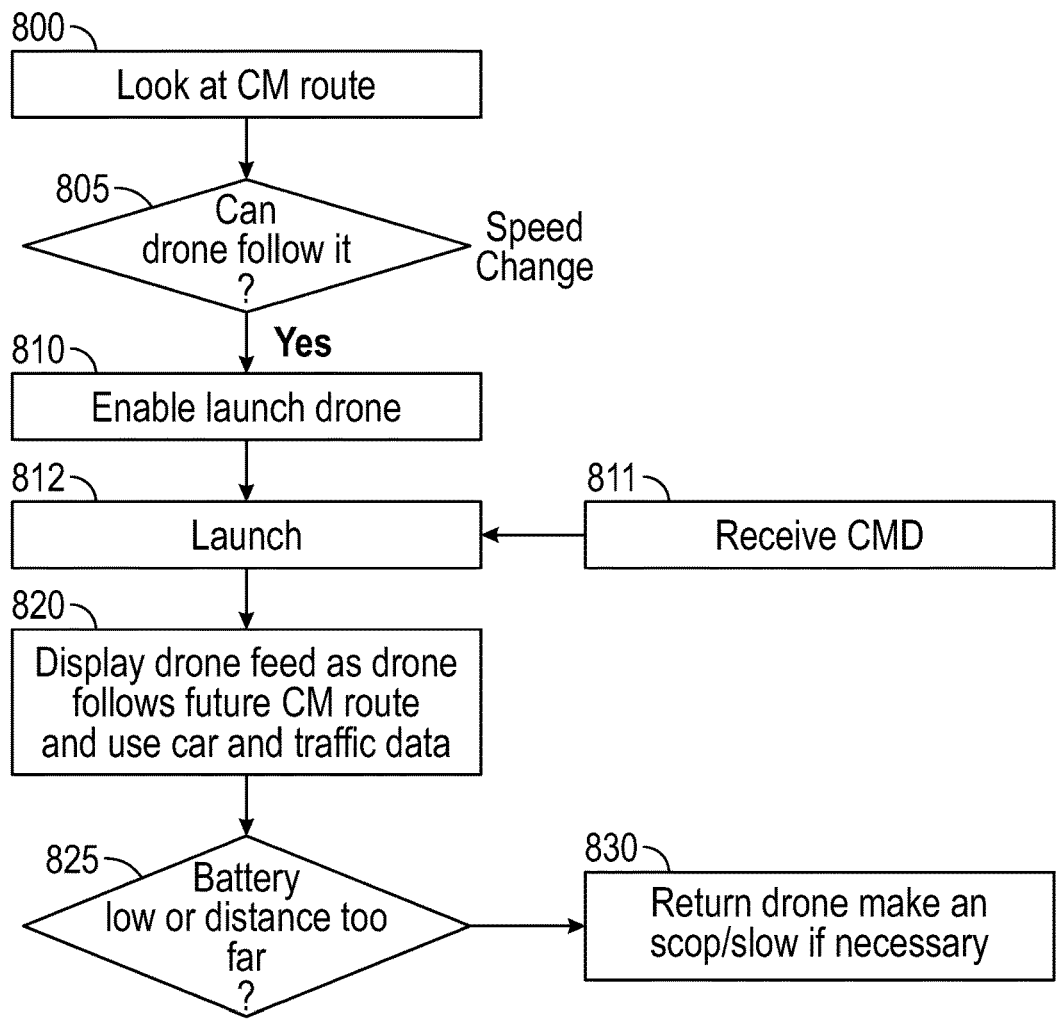
FIG. 8 illustrates an embodiment of controlling the drone.

The processor 699 can execute the flowchart shown in FIG. 8 to control the drone as described herein. At 800, a threshold question is determined, about whether the drone can follow the current routing of the car. The current car route is investigated at 800, and analysis at 805 figures out whether the drone can follow the route. This may look at current speed of the vehicle, charge level of the drone, and geographical information such as topography. If the drone is determined to be likely to be able to follow the current car route, then the drone launch is enabled. As one example, when a vehicle is stopped in stop and go traffic, the drone may be automatically enabled because the drone can certainly follow the vehicle in stopped traffic. However, there may also be no-fly zones for a drone, including areas in urban situations, where the drone cannot be allowed.

In one embodiment, the drone only raises above the vehicle, and follows the vehicle's movement. In another embodiment, the drone is allowed to follow the future route of the vehicle ahead of the vehicle.

In one embodiment, when the drone is enabled, a drone launch button may be become selectable in the vehicle, and at other times when the drone is not enabled, the drone launch can be grayed out.

Once the drone launch is enabled, at 811, the system can receive a command to launch the drone, followed by a drone launch at 812. This causes the drone to take off, and may cause the drone to follow the future route of the car 'for example for some specified distance. In one embodiment, the drone can be commanded to go to two thirds of its maximum altitude, and to view along the desired route of the car.

820 displays the drone feed as the drone follows the future car route. This can use this information also to provide routing information for the vehicle and also to provide information for the user. The user may also be able to command the drone to get closer to a specified action such as closer to an accident.

The drone continually keeps track of its location relative to the vehicle and relative to its charge capability. When the battery is low, or the drone becomes too far a distance, then the drone is caused to return to the car at 830. This may require that the car either slow down or stop if the car is moving too fast. In one embodiment, the car may be forced to pull off the road or slow down so that the drone can return as necessary.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A vehicle with a sensing system, comprising:
   plural sensors which sense conditions around the vehicle; and
   a processing system which uses information from the sensors to determine operating characteristics regarding the vehicle;
   plural extendable mounts, at least plural of the sensors being mounted on one of the extendable mounts,
   the processing system determining a future path of the vehicle at a future time from a current time;
   each extendable mount being controlled by the processing system based on road locations along the future path of the vehicle, including a difficulty of driving along the future path of the vehicle to extend the sensor from a stowed position adjacent the skin of the vehicle, to an extended position which is a first distance outside of the skin of the vehicle and to obtain information for the processing system from the sensor in the extended position.

2. The system as in claim 1, wherein the extendable mount is an extendable telescopic stalk.

3. The system as in claim 2, wherein the sensor is at a terminal end of the telescopic stalk.

4. The system as in claim 2, wherein the sensor has an electronic sensor device inside the skin of the vehicle, and the stalk includes a radiation guide that guides radiation from an end of the stalk to the electronic device inside the vehicle.

5. The system as in claim 2, wherein an end of the stalk includes a moving mirror that reflects radiation from different locations based on the position of the mirror.

6. The system as in claim 2, wherein the stalk includes an antenna for an electronic sensor device.

7. The system as in claim 1, where the extendable mount is an arm with an axis along a length thereof, and that has the sensor at an end thereof, and the arm pivots between a stowed position, where the axis is parallel to the skin of the vehicle, but the sensor is exposed even though the arm is stowed, and unfolds to an unfolded position by pivoting relative to the skin of the vehicle, where the axis of the arm is perpendicular to the skin of the vehicle and the sensor is spaced from the skin of the vehicle by a length of the arm.

8. The system as in claim 1, where the extendable mount is a dome on the roof of the vehicle that extends between a first position where the sensor is against a skin of the vehicle on a roof of the vehicle, and extended position where the sensor is above the roof of the vehicle by a distance of the extending.

9. The system as in claim 1, where the vehicle includes a processor that automatically determines a difficulty of driving along the future path of the vehicle, and controlling the extendable mount based on the difficulty of driving along the future path of the vehicle, the extendable mount controlled between:
   an aggressive extending when the vehicle will be in a bad viewing location along the future path of the vehicle,
   a medium extending the extendable mount when the system determines that it may need additional information, but the additional information will not be imminent, which extends the extendable mount less aggressively than the aggressive extending, and
   a minimal extending which extends the extendable mount less aggressively than the medium extending,
   and where the processor provides an electrical signal to each extendable mount to extend the extendable mount when determines to extend the mounts.

10. The system as in claim 9, wherein the processor raises all of the extensions very fast or aggressive, raises the extensions at lower speed for medium, and raises the extensions at the lowest speed for minimal.

11. The system as in claim 9, wherein the processor automatically determines that all mounts should be lowered when the vehicle is not moving.

12. The system as in claim 1, where the sensor includes a camera.

13. The system as in claim 1, where the sensor is mounted on a device that is separable from the vehicle.

14. The system as in claim 13, wherein the device that is separate from the vehicle is a drone that separates from the vehicle and obtains data regarding an area of the vehicle from above the vehicle.

15. The system as in claim 13, where the device that is separable from the vehicle is monitored for battery level, and caused to automatically return when the battery level reaches a specified amount.

16. A vehicle with a sensing system, comprising:
   a vehicle that moves along a path;
   plural sensors which sense conditions around the vehicle; and
   a processing system which uses information from the sensors to determine operating characteristics regarding a future path of the vehicle,
   a drone, connected to the vehicle and which takes off from the vehicle to fly above the vehicle to obtain information regarding the path, including video information about the future path of the vehicle from the above the vehicle, the processing system determining whether the drone can follow the future path of the vehicle and enables the drone to launch only when the drone can follow the future path of the vehicle and does not enable the drone to launch when the drone cannot follow the future path of the vehicle; and a display, that displays information from the drone.

17. The vehicle as in claim 16, further comprising a drone launch control, which is selectable to launch the drone only when the drone can follow the future path of the vehicle, and is not selectable to launch the drone when the drone cannot follow the future path of the vehicle.

* * * * *